Sept. 9, 1958 S. G. MARTINELLI 2,851,183
CROWN-CAPPED EFFERVESCENT WINE BOTTLE WITH PLASTIC
RESEAL CLOSURE PACKAGED THEREON
Filed Aug. 23, 1957
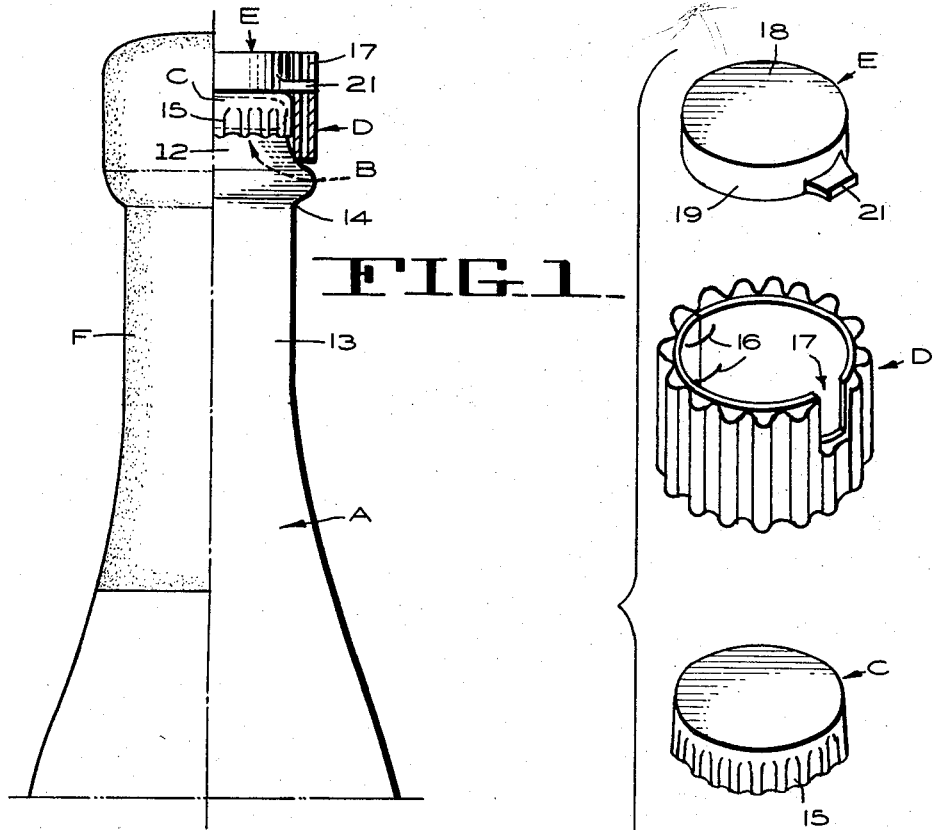
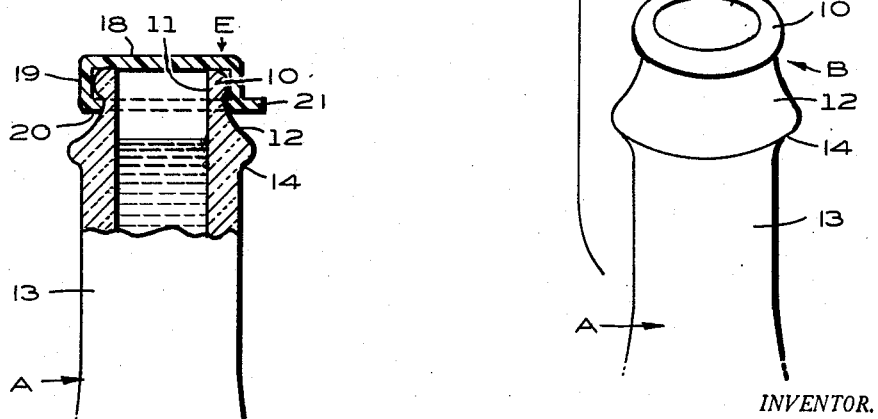
INVENTOR.
STEPHEN G. MARTINELLI
BY
Munn & Liddy
ATTORNEYS

United States Patent Office 2,851,183
Patented Sept. 9, 1958

2,851,183

CROWN-CAPPED EFFERVESCENT WINE BOTTLE WITH PLASTIC RESEAL CLOSURE PACKAGED THEREON

Stephen G. Martinelli, Watsonville, Calif.

Application August 23, 1957, Serial No. 679,826

5 Claims. (Cl. 215—38)

The present invention relates to improvements in a crown-capped effervescent wine bottle with plastic reseal closure packaged thereon. It consists of the combinations, constructions, and arrangement of parts, as hereinafter described and claimed.

The term "effervescent wine" is all inclusive and in the Treasury Department wine regulations it includes champagne or sparkling wine made by a secondary fermentation in the bottle; champagne or sparkling wine made by the bulk process, such as a secondary fermentation in a closed pressure tank; and, also, a third process, such as carbonated wine made by injecting carbon dioxide gas into the wine.

For the purpose of simplicity, I shall refer more particularly to champagne, although I do not wish to be limited in this respect.

Specifically, the ordinary crown cap is being used at the present time as a closure for bottle-fermented champagne up to the point when the champagne is "disgorged" to remove the sediment which has collected in the neck of the bottle. The crown cap is then replaced with a regular natural cork for champagne or with one of the new plastic substitutes made of polyethylene. Both the regular cork and polyethylene cork are held in place by a wire hood. They are frequently extremely difficult to remove; however, they do provide a means of reclosure, if the contents of the bottle are not used at once. The crown cap in itself is not suitable as a reclosure; and, although champagne bottles are available with the crown cap finish, the use of the crown cap is confined to the bottle-fermenting stage of the process only. The crown finish champagne bottle also accepts either a regular champagne cork or the polyethylene substitute.

I have developed a suitable means of using the crown cap as a finish closure for champagne (or other effervescent wine) bottles by providing a plastic reseal closure, in combination with the crown cap, and by providing means for the holding of these parts together so they are at hand when the bottle is to be opened. After opening, the plastic reseal closure is used to seal the bottle and hold the effervescence in any liquid remaining in the bottle.

Other objects and advantages will appear as the specification proceeds. The novel features will be particularly pointed out in the claims hereunto appended.

*Drawing*

For a better understanding of the invention, reference should be had to the accompanying drawing, forming part of this specification, in which:

Figure 1 is an elevational view of a fragmentary portion of an effervescent wine bottle having my unit packaged thereon, parts being shown in section and the embellishing foil being partly broken away;

Figure 2 is an "exploded" view showing the several parts in isometric; and

Figure 3 shows the upper portion of the bottle, after the crown cap has been replaced by the plastic reseal closure.

While I have shown only the preferred form of my invention, it should be understood that various changes, or modifications, may be made within the scope of the annexed claims without departing from the spirit thereof.

*Detailed description*

Referring to the drawings, I have shown a conventional champagne bottle, which is designated generally at A, the neck portion of which is provided with a crown finish B. The latter defines an annular bead 10 which surrounds the opening 11 in the bottle neck, and is disposed above a downwardly-expanding flare 12. The flare merges into the neck 13 so as to define an annular shoulder 14, the latter being for the purpose of fastening the wire hood (not shown) when a regular natural or polyethylene cork substitute is used.

It will be noted from Figure 1 that the bottle A may be closed by applying a crown cap C to the crown finish top, with the crimped shirt 15 yieldingly engaging over the annular bead 10. As previously mentioned, when this crown cap is once removed it is not suitable as a reclosure.

Moreover, a band or ring D has been provided to encircle the crown cap C and it rests on the flare 12 below the annular bead 10. This band may be made from corrugated paper, as shown in Figure 2. Also, it may be made of plastic or other material besides paper. If made of paper, it can be cut from a sheet of corrugated board, or from plain cardboard, and fastened together with metal clips 16 (see Figure 2), staples, "Scotch" cellophane tape or adhesive; or it may be cut in circular sections from cardboard or corrugated tube of proper size. It will be noted that the band D is fashioned with a small notch 17 in its upper edge, the purpose of which will be set forth presently.

As a further part of my unit, I make use of a standard flexible plastic reseal closure E. This closure defines a disc 18 that is adapted to abut the annular bead 10 (see Figure 3), and this disc has a depending skirt 19 which is designed to fit over the bead 10. The lower end of this skirt is formed with an inwardly-extending flange 20 that is designed to snap under the bead 10 for holding the reseal closure in place over the opening 11 of the bottle neck. This reseal closure has a small projecting lug 21 which serves as a lifting tab when removing the reseal closure from the neck of the bottle by applying upward pressure with a person's fingers or thumb.

Referring to Figure 1, the assembled parts are shown as being packaged on the top of the bottle A. As disclosed, the plastic reseal closure E is placed in position upon the crown cap C, the latter being crimped over the annular bead 10, and with the reseal closure nesting within the band or ring D. The projecting lug 21 is accommodated in the notch 17 of the band, and thus the reseal closure E is stored within the confines of the band D.

Champagne bottles are embellished with tin or aluminum foil, such as indicated at F in Figure 1. This foil may be made with various colors, and adhesive applied to the foil, after which the foil is wrapped around the neck of the bottle and folded in place. Such foil is also used with my combination and serves the double purpose of embellishing the package as well as securely binding the crown cap C, the band D and the attached plastic reseal closure E firmly together. The foil further provides a dust proof cover for the plastic reseal closure. Standard foil or lead preformed capsules dropped over the neck of the bottle and squeezed into place could also be used as above.

When opening the bottle A, the foil F is readily broken and removed from around the top of the bottle, exposing the plastic reseal closure E and the band D, these being readily removed for exposing the crown cap C, which in turn is easily removed with a conventional bottle opener.

The advantages of my combination are easy-opening, in fact easy enough for a woman to accomplish, whereas the removal of the usual wire hood and natural cork or polyethylene substitute is frequently a tough job, requiring a cork screw for the cork or pliers to grip the head of the polyethylene cork; and also avoiding the hazard of having either type of cork occasionally blow out as soon as the wire hood is removed. With my combination the plastic reseal closure takes care of the reseal problem.

It will be noted that my combination also simulates the appearance of the other method as they look alike before the foil wrap F is broken. However, my combination represents a considerable saving in cost of production besides providing greater convenience and safety for the consumer. There is also no cork, either natural or polyethylene, to occasionally prematurely blow out when the wire hood is removed. It is well known that people have been hit with such wild corks.

I claim:

1. The combination with an effervescent wine bottle having a neck provided with an annular bead at its top, and a crown cap removably secured over the bead to close the top of the bottle; of a band removably mounted around the crown cap and extending above the latter; and a reseal closure positioned on the top of the crown cap, and being normally nested within the band; the reseal closure including a disc having a resilient skirt depending therefrom, which is dimensioned to be applied over the annular bead to close the top of the bottle, when the crown cap and the band are removed; the skirt having an inwardly-extending flange at its lower end which is designed to snap under the annular bead when the reseal closure is used to close the top of the bottle.

2. The combination as defined in claim 1; and in which the bottle neck is provided with a downwardly-expanding flare disposed below the annular bead; the band having a lower end resting on the flare for support thereby, when the band is arranged around the crown cap.

3. The combination as defined in claim 1; and in which the band is fashioned with a notch in its upper edge; and the reseal closure is provided with a projecting lug, which may be used as a lifting tab when removing the reseal closure from the bead; this lug being accommodated in the notch of the band when the reseal closure is packaged on top of the crown cap.

4. The combination as defined in claim 1; and in which an embellishing foil is wrapped around the neck of the bottle and extends over the top of the band; this foil binding the crown cap, the band and the reseal closure firmly together, with the foil providing a dust proof cover for the reseal closure.

5. The combination with an effervescent wine bottle having a neck provided with an annular bead at its top, and a crown cap removably secured over the bead to close the top of the bottle; the bottle neck being provided with a downwardly-expanding flare disposed below the annular bead; of a band removably mounted around the crown cap and extending above the latter; the band having a lower end resting on the flare for support thereby, when the band is arranged around the crown cap; a reseal closure positioned on the top of the crown cap, and being normally nested within the band; the reseal closure being designed to be snapped over the annular bead to close the top of the bottle, when the crown cap and the band are removed; the band being fashioned with a notch in its upper edge; the reseal closure being provided with a projecting lug, which may be used as a lifting tab when removing the reseal closure from the bead; this lug being accommodated in the notch of the band when the reseal closure is packaged on top of the crown cap; and an embellishing foil wrapped around the neck of the bottle and extending over the top of the band; this foil binding the crown cap, the band and the reseal closure firmly together, with the foil providing a dust proof cover for the reseal closure.

References Cited in the file of this patent

UNITED STATES PATENTS

| | | |
|---|---|---|
| 1,923,091 | Hoffman | Aug. 22, 1933 |
| 2,007,257 | Scofield | July 9, 1935 |